(12) United States Patent
Hodgson et al.

(10) Patent No.: US 8,756,919 B2
(45) Date of Patent: Jun. 24, 2014

(54) DEVICE FOR PROVIDING LIQUID REDUCING AGENT, METHOD FOR THAWING FROZEN REDUCING AGENT AND MOTOR VEHICLE HAVING THE DEVICE

(75) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 13/601,342

(22) Filed: Aug. 31, 2012

(65) Prior Publication Data

US 2013/0192204 A1   Aug. 1, 2013

Related U.S. Application Data

(63) Continuation of application No. PCT/EP2011/051435, filed on Feb. 2, 2011.

(30) Foreign Application Priority Data

Mar. 5, 2010   (DE) .................. 10 2010 010 528

(51) Int. Cl.
*F01N 3/00*   (2006.01)
*F01N 3/10*   (2006.01)

(52) U.S. Cl.
USPC .................... 60/286; 60/295; 60/301; 60/303

(58) Field of Classification Search
USPC ..................... 60/286, 295, 301, 303
See application file for complete search history.

(56) References Cited

U.S. PATENT DOCUMENTS

| 5,884,475 | A  | * | 3/1999 | Hofmann et al. | 60/274 |
| 7,930,878 | B2 | * | 4/2011 | Cook et al. | 60/286 |
| 2010/0146940 | A1 | * | 6/2010 | Goulette et al. | 60/286 |
| 2010/0220984 | A1 |   | 9/2010 | Potier et al. |  |
| 2011/0168280 | A1 |   | 7/2011 | Krause et al. |  |

FOREIGN PATENT DOCUMENTS

| DE | 10 2006 061 735 A1 | 7/2008 |
| DE | 102007041524 A1 | 3/2009 |
| DE | 102008041723 A1 | 3/2010 |
| WO | 2008/138960 A1 | 11/2008 |

OTHER PUBLICATIONS

International Search Report of PCT/EP2011/051435, Dated May 9, 2011.

* cited by examiner

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

A device for providing a liquid reducing agent includes a reducing agent tank for storing the liquid reducing agent. The reducing agent tank has at least one heater disposed in a movable manner in the reducing agent tank and constructed as an active heater. A method for thawing frozen reducing agent and a motor vehicle having the device are also provided.

8 Claims, 5 Drawing Sheets

DEVICE FOR PROVIDING LIQUID REDUCING AGENT, METHOD FOR THAWING FROZEN REDUCING AGENT AND MOTOR VEHICLE HAVING THE DEVICE

CROSS-REFERENCE TO RELATED APPLICATION

This is a continuation, under 35 U.S.C. §120, of copending International Application No. PCT/EP2011/051435, filed Feb. 2, 2011, which designated the United States; this application also claims the priority, under 35 U.S.C. §119, of German Patent Application DE 10 2010 010 528.7, filed Mar. 5, 2010; the prior applications are herewith incorporated by reference in their entirety.

BACKGROUND OF THE INVENTION

Field of the Invention

The invention relates to a device for providing a liquid reducing agent. In particular, the invention relates to a device of the tank type which provides a liquid reducing agent and has a particularly efficient heater, with which frozen reducing agent can be returned to a melted state. The invention also relates to a method for thawing frozen reducing agent and a motor vehicle having the device.

The SCR method is often used to purify the exhaust gases of internal combustion engines and, in particular, of mobile internal combustion engines. Nitrogen oxide compounds ($NO_x$) in the exhaust gas of an internal combustion engine can be reduced effectively by using the SCR method. To that end, a reducing agent is fed to the exhaust gas of the internal combustion engine. The reducing agent is ammonia, for example. Ammonia is very difficult to store directly in a motor vehicle. For that reason, ammonia precursors are frequently stored and are then converted into ammonia ($NH_3$) in the required quantities during operation of the internal combustion engine. A reducing agent precursor of that type, which is used particularly often, is aqueous urea solution ($CH_4N_2O$). An aqueous solution with a urea content of 32.5 per cent is obtainable under the trademark AdBlue and is very widely available. For simplicity's sake, reducing agent precursors are also described hereinafter as reducing agents.

In the motor vehicle, reducing agent is frequently stored in a separate tank. A problem with regard to such storage is that the reducing agent freezes at temperatures which are likely to occur during operation. A conventional urea/water solution freezes, for example, at temperatures of −11° C. Such low temperatures can occur in motor vehicle tanks, in particular, when the vehicle is stationary for a long time.

The reducing agent can consequently only be conveyed readily out of the described tank into the exhaust gas system of the internal combustion engine when the reducing agent is available in a sufficient amount in liquid form in the tank. For that reason it is conventional to provide the tank for the reducing agent with a heater, in such a way that the reducing agent in the tank can be melted if it has frozen. Such a heater should (specifically) heat the reducing agent as quickly and reliably as possible under all conceivable operating conditions and use as little energy as possible.

SUMMARY OF THE INVENTION

It is accordingly an object of the invention to provide a device for providing liquid reducing agent, a method for thawing frozen reducing agent and a motor vehicle having the device, which overcome the hereinafore-mentioned disadvantages and at least alleviate the highlighted technical problems of the heretofore-known devices, methods and vehicles of this general type.

With the foregoing and other objects in view there is provided, in accordance with the invention, a device for providing a liquid reducing agent. The device comprises a reducing agent tank for storing the liquid reducing agent, at least one active tank heater movably disposed in the reducing agent tank, an extraction point for reducing agent, and an active vent heater configured to form a channel between the at least one active tank heater and the extraction point.

Such a device preferably also includes a feed unit, with which the liquid reducing agent may be conveyed out of the reducing agent tank to an exhaust gas treatment device. Lines for transporting the reducing agent, valves, pumps, filters, etc. may be provided for this purpose. It is additionally possible for at least part of the feed unit to be disposed on or in the reducing agent tank, wherein the feed unit is optionally separated from the reducing agent by a portion of the tank wall. The reducing agent tank is preferably made of a plastics material, although this is not absolutely necessary. The reducing agent tank may additionally include a filling orifice, sensors, closures, dividers, thermal insulators, etc.

For the purposes of the present invention, an "active" heater is, in particular, a self-heating heater, which introduces thermal energy into the reducing agent tank and does not only assist in distributing the thermal energy. Such an active heater may, for example, be electrically operated (specifically at predetermined times). A heater which introduces thermal energy from the cooling water of an internal combustion engine into the reducing agent tank is also regarded as an active heater. Preferably, the active heater converts a specific form of energy (for example electrical or mechanical energy) into heat. An active heater is, in particular, also distinguished by it not being passive, i.e. merely thermally conductive.

The mobile configuration of the active heater in the reducing agent tank makes it possible for the heater always to be positioned in the vicinity of the reducing agent in the case of different filling levels of the reducing agent in the reducing agent tank. In particular, the heater may in each case be positioned in the vicinity of the filling level or the surface in the reducing agent tank. If the reducing agent in the tank is partially already liquid and partially still frozen, the mobile heater may be disposed in the vicinity of the frozen reducing agent, in such a way that heat may be introduced particularly efficiently into the frozen reducing agent. It is preferable for the active heater to be moved in a guided manner, in such a way that its scope for movement is limited, for example. This may mean, for example, that the active heater is movable only in predetermined dimensions or directions, and/or that it can only move to a limited extent away from a reference point. In this way it may be ensured, for example, that the active heater is connected to the energy source (e.g. a power source) even when conditions in the reducing agent tank are unfavorable.

The mobile configuration of an active heater thus leads, in particular, to the active heater being positioned, irrespective of the current filling level or the current location of the reducing agent, purposefully and precisely (in a spatially restricted manner) where heat may be introduced directly into the frozen reducing agent, without significant amounts of liquid reducing agent and/or a gas significantly hindering heat transfer.

The feed unit draws off reducing agent from the reducing agent tank at the extraction point. The position of the extraction point in the reducing agent tank is frequently fixed. The extraction point is preferably disposed in the vicinity of the tank bottom. This allows reducing agent to be drawn off even when levels are low. The heater is frequently disposed at a distance from the extraction point. In particular when filling levels are high, the heater is frequently disposed at the top of the tank while the extraction point is in the vicinity of the tank bottom. This is why it is advantageous for a vent heater to be provided in addition to the heater. The vent heater is capable of quickly melting a channel (permitting the passage of gas and/or liquid) in the frozen reducing agent from the heater to the extraction point. A large amount of reducing agent is normally melted in the area surrounding the heater. This reducing agent may then pass through the channel to the extraction point, and in the same way gas equalization may be achieved between spaced-apart regions of the reducing agent tank which are separated by the frozen reducing agent.

In accordance with another advantageous feature of the device of the invention, the at least one heater takes the form of a float. The heater then floats in the vicinity of a surface and/or of the filling level, when the reducing agent is (partially) liquid. If the reducing agent is frozen, the heater remains in this position. The heater is thus always in the vicinity of the reducing agent whatever the filling level. Once frozen reducing agent from the region surrounding the active heater has been melted, the melted liquid reducing agent can efficiently transfer heat by convection from the heater to the still frozen reducing agent. It is likewise possible, for example, for the active heater (again) to move in the direction of the (still) frozen reducing agent fraction. The active heater may itself take the form of a float and/or be connected to or cooperate with at least one float. It is optionally also possible for a plurality of heaters to cooperate with a single float, but it is preferable for each heater to be provided with its own (separate) float. A float is frequently an object which is in itself able to float due to its buoyancy resulting from displacement according to Archimedes' principle. Floats which are not formed of a material which is in itself buoyant can, for example, be provided with chambers containing air and/or a light solid.

In accordance with a further advantageous feature of the device of the invention, the at least one heater includes at least one heating portion and at least one buoyancy portion. Such a two-part construction of the heater is capable of ensuring that the heating portion is in each case completely surrounded by reducing agent, while the buoyancy portion determines the position of the heater in the reducing agent tank. In particular, the buoyancy portion predetermines the position of the heater in the vicinity of the filling level or a surface of the reducing agent. Since the heating portion is completely surrounded by reducing agent, heat is introduced efficiently into the reducing agent. It is accordingly preferable for the at least one heating portion to be disposed on the outside facing the reducing agent and the at least one buoyancy portion to be disposed inside or out of direct contact with the reducing agent.

In accordance with an added advantageous feature of the device of the invention, the at least one heater includes a supply line for supplying the heater with energy, wherein an active vent heater is also provided on the supply line. The active (electric) heater has to be supplied with energy to heat the reducing agent and for this purpose requires a supply line. In general at least one electric line is provided in the supply line. The vent heater may accordingly, for example, also take the form of a heating conductor in the supply line. The (at least partially rigid and/or flexible) supply line may, for example, extend out from a location in the reducing agent tank in the vicinity of the extraction point to the heater. If the supply line includes a vent heater, this allows formation of a channel between the heater and the extraction point in the frozen reducing agent.

In accordance with an additional advantageous feature of the device of the invention, at least one component is provided on the at least one heater for detecting the filling level of the reducing agent in the reducing agent tank. The active heater frequently takes the form of a large-area float in the reducing agent tank. The position of the heater varies depending on the filling level. For this reason, the position of the heater may particularly advantageously be used to detect the filling level.

It is additionally preferable, in order to determine the filling level in the reducing agent tank, for the at least one heater to cover more than 50%, preferably more than 80% and particularly preferably more than 90%, of the surface of the reducing agent. A free reducing agent surface is generally needed for the reducing agent to slosh about in the reducing agent tank. If the heater covers a large area of the surface of the reducing agent in the reducing agent tank, sloshing in the reducing agent tank may be effectively reduced. Sloshing movements in the reducing agent tank are highly disadvantageous for the accurate determination of the filling level in the reducing agent tank, because they lead to varying filling level signals.

In accordance with yet another advantageous feature of the device of the invention, a guide structure is provided in the reducing agent tank for the at least one heater, along which the at least one heater may be moved. Such a guide structure may ensure that the heater is not uncontrolledly movable in the reducing agent tank. In this way it is also possible, for example, to prevent the heater from punching against an extraction pipe for the reducing agent and/or against the tank wall of the reducing agent tank and/or a sensor and therefore cause undesired noise and/or damage. In this case it is likewise possible for an extraction pipe for drawing a reducing agent off from a reducing agent tank to simultaneously form the guide structure for the heater.

In accordance with yet a further advantageous feature of the device of the invention, the at least one heater is disposed or shaped in such a way that, when it is in operation on a frozen reducing agent surface, a run-off surface is formed for thawed reducing agent. The reducing agent thawed by the heater frequently has to be able to pass towards the reducing agent extraction point. For this purpose, the heater is suitably disposed and/or shaped to shape the surface of the frozen reducing agent in such a way that a run-off surface or at least a run-off groove is formed. Preferably the frozen reducing agent surface runs approximately in the form of a funnel towards the extraction point and/or the start of the channel.

The active mobile heater may consequently be entirely funnel-shaped. Alternatively or additionally, the heater may include fins. The fins may structure the frozen reducing agent surface in such a way upon thawing that the thawed reducing agent may run off towards the extraction point and/or towards the start of the vent heater channel. Such a run-off surface for thawed reducing agent should, in particular, also ensure that reducing agent reaches the extraction point quickly and in its entirety even if the motor vehicle is travelling in an oblique orientation.

With the objects of the invention in view, there is also provided a method for thawing frozen reducing agent in a reducing agent tank. The method comprises at least the following steps:
 a) movably positioning at least one active heater in vicinity of a reducing agent surface;
 b) activating the at least one heater if the reducing agent is frozen at the reducing agent surface;

c) thawing the reducing agent at the reducing agent surface and moving the at least one heater; and d) feeding the thawed reducing agent to an extraction point for the reducing agent.

Steps a) to d) of the method according to the invention are typically repeated continuously. Often steps a) to d) also each run continuously and in parallel with one another. While the heater is being activated (step b)), it also moves further towards the reducing agent surface (step a)). At the same time, reducing agent is being thawed at the reducing agent surface (step c)) and fed to the extraction point for the reducing agent (step d)).

As a result of the method according to the invention, the heater always introduces heat into the reducing agent precisely where frozen reducing agent is present. This increases the heater's effectiveness. At the same time, it is ensured in this way that the heater is always in a position to thaw reducing agent.

The advantages and special configurations in each case described individually for the device according to the invention and for the method according to the invention are applicable both to the method and the device. The method according to the invention may be performed with a device according to the invention.

With the objects of the invention in view, there is concomitantly provided a motor vehicle, comprising an internal combustion engine and an exhaust gas treatment device including a reducing agent feed and a device according to the invention. The motor vehicle according to the invention is, in particular, also set up or configured to carry out the method according to the invention. This technical environment is described in greater detail with reference to the figures.

Other features which are considered as characteristic for the invention are set forth in the appended claims, noting that the features listed individually in the claims may be combined together in any desired, technologically meaningful way and may be supplemented by explanatory facts from the description, wherein further variant embodiments of the invention are presented.

Although the invention is illustrated and described herein as embodied in a device for providing liquid reducing agent, a method for thawing frozen reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
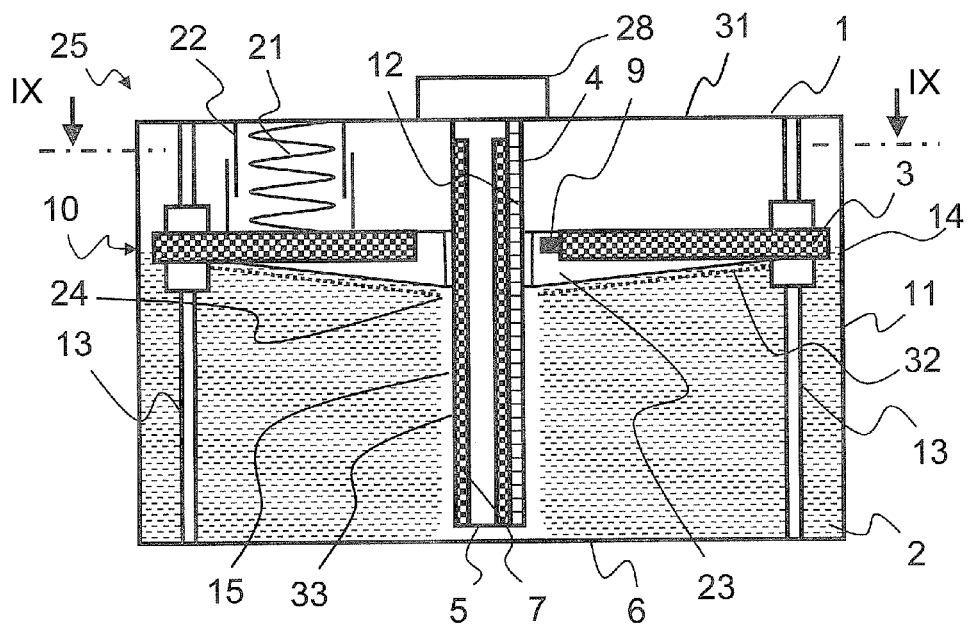
FIG. 1 is a diagrammatic, vertical-sectional view of a first variant embodiment of a device according to the invention.

Referring now in detail to FIGS. 1 to 7 of the drawings, which show particularly preferred exemplary embodiments to which the invention is not limited, in which size ratios are diagrammatic and in which identical components are provided with identical reference numerals, there are seen various variant embodiments of a device 25 according to the invention, having common features which are described herein together. The device 25 according to the invention in each case includes a reducing agent tank 1, which is filled with reducing agent 2 up to a filling level 10. An extraction point 5 for drawing off reducing agent 2 from the reducing agent tank 1 is disposed in the vicinity of a tank bottom 6 in each case. The reducing agent 2 in each case passes from the extraction point 5 to a feed unit 28. The feed unit 28 is responsible for transporting the reducing agent 2 to an exhaust gas treatment device. A feature common to all of the variant embodiments in FIGS. 1 to 7 is that at least one mobile active heater 3 is disposed in the reducing agent tank 1, floating on the reducing agent 2 or in the reducing agent 2. The electric heater 3 is supplied with energy through an electric supply line 21 (a corresponding type of supply line (e.g. hot water, etc.) may be provided in another type of active heater).

The supply line 21 may be at risk if it is surrounded by liquid reducing agent 2. Under unfavorable circumstances the supply line 21 may tear as a result of the expansion of the reducing agent 2. For this reason, in the variant embodiments of FIGS. 1, 2, 3, 4 and 7, the supply line 21 is guided in such a way that it lies above the filling level 10 of the reducing agent 2 in the reducing agent tank 1. FIG. 1 additionally shows a protective device 22, with which the supply line 21 is protected. According to FIGS. 5 and 6, the supply line 21 passes through the liquid reducing agent 2. In this configuration, the supply line 21 is of sufficiently robust or flexible construction to be able to withstand the loads arising upon freezing of the reducing agent 2. The supply line 21 according to FIGS. 5 and 6 may moreover also be extensible, so that it can become longer in order not to be damaged. The supply line 21 may preferably be reversibly extensible by at least 10%, preferably at least 15%.

Figure 2:
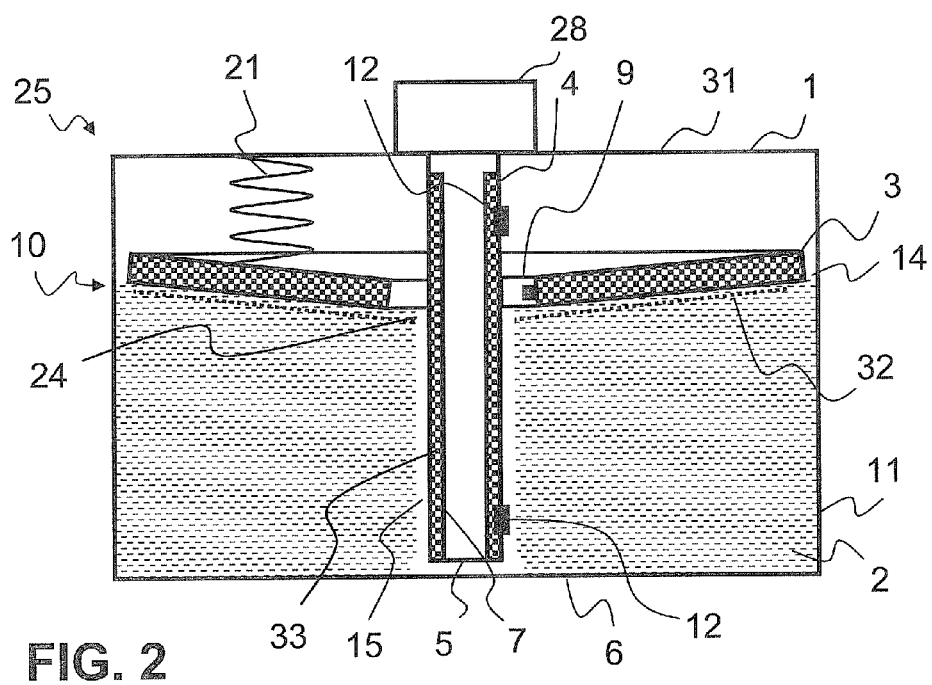
FIG. 2 is a similar view of a second variant embodiment of a device according to the invention.
Figure 3:
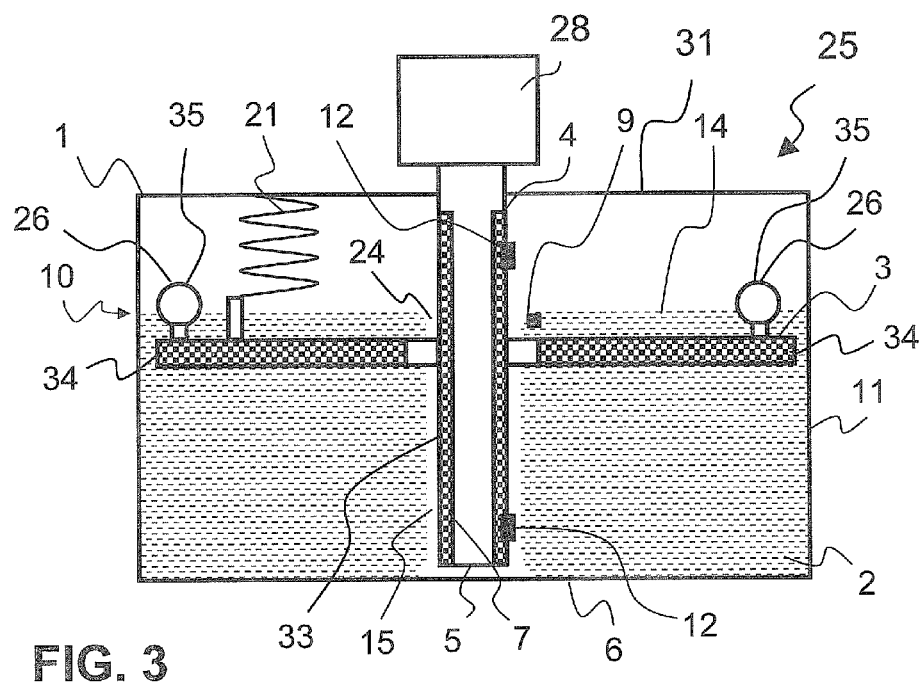
FIG. 3 is a similar view of a third variant embodiment of a device according to the invention.

According to FIGS. 1 to 3, the feed unit 28 is disposed at a top 31 of the reducing agent tank 1. The reducing agent 2 passes from the extraction point 5 through an extraction pipe 4 to the feed unit 28. In the variant embodiments of FIGS. 4, 5 and 7, the feed unit 28 is disposed in the vicinity of the tank bottom 6. The feed unit 28 is then disposed in the immediate vicinity of the extraction point 5. These variant embodiments dispense with the extraction pipe 4. FIG. 6 discloses a floating variant of the feed unit 28 in the reducing agent tank 1. In this case, the extraction point 5 is disposed at the feed unit 28 and not in the vicinity of the tank bottom 6 and is movable together with the feed unit 28 in the reducing agent tank 1. The feed unit 28 preferably includes at least one pump, one valve and/or one filter, through which the drawn-off reducing agent 2 flows.

A common feature of the variant embodiments of the device according to the invention shown in FIGS. 1 to 3 with the feed unit 28 disposed at the top 31 of the reducing agent tank 1, is that heating elements 7 are disposed at the extraction pipe 4. These constitute a vent heater 33. A channel 15 may be thawed in the frozen reducing agent 2 from the heater 3 to the extraction point 5 through the use of this vent heater 33.

In the variant embodiments shown in FIGS. 1 to 3, the heater 3 may at the same time also determine the filling level 10 in the reducing agent tank 1. To this end, a first component 9 is fastened to the heater 3 for determining filling level. The first component 9 cooperates with second components 12 which, according to FIGS. 1 to 3, are each attached by way of example to the extraction pipe 4. The second components 12 may also be attached to a tank wall 11. This is particularly helpful in the variants of the device 25 without an extraction pipe 4. The filling level 10 in the reducing agent tank 1 may be identified through cooperation of the first component 9 and the second components 12. This may, for example, proceed by using an electrically conductive contact between the first component 9 and the second components 12 through a magnetic field or a similar method for determining the filling level. Other methods of determining the position of a float in a vessel may also be used.

FIG. 1 also shows that the heater 3 is guided in the reducing agent tank 1 by a guide structure 13. This may prevent the heater 3 from moving uncontrolledly in the reducing agent tank 1. The variant embodiment according to FIG. 4 also has such a guide structure 13 for the heater 3.

It is furthermore shown that the heater 3 includes fins 23, through which a frozen reducing agent surface 14 may be shaped so as to produce a suitable run-off surface 32 for reducing agent 2 to the extraction point 5 and/or to an inlet 24 of a channel 15.

Figure 9:
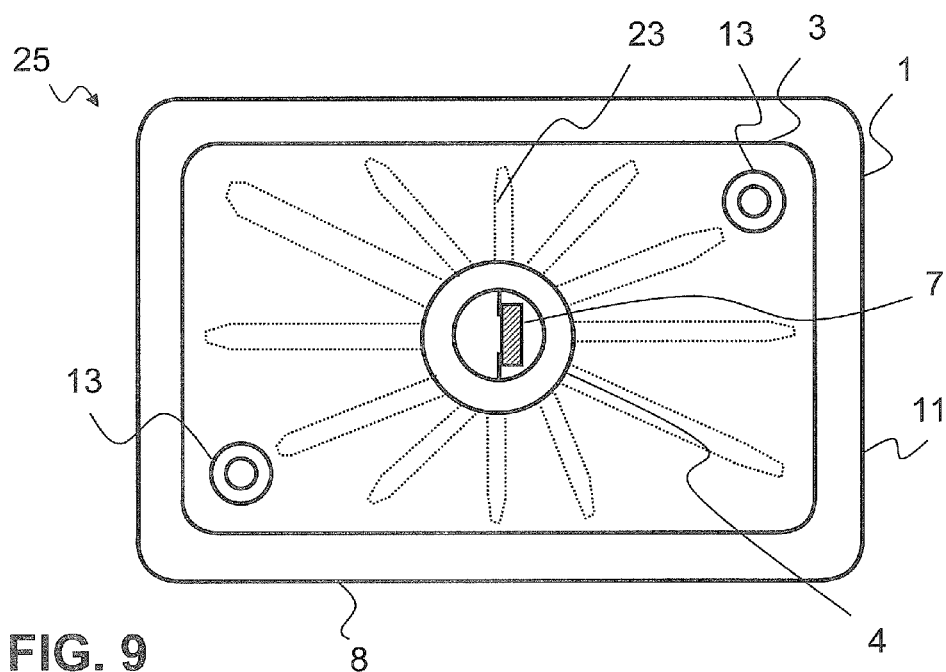
FIG. 9 is a cross-sectional view taken along a line IX-IX of FIG. 1, in the direction of the arrows, showing the first variant embodiment of the device according to the invention from above.

In order to assist in understanding the mode of action of the guide structure 13 and the fins 23, the variant embodiment according to FIG. 1 is illustrated again in FIG. 9 from another perspective. FIG. 9 shows a section from above through this variant embodiment. The guide structures 13 for guiding the heater 3 can be seen. The reducing agent tank 1, in which the heater 3 is guided by the guide structure 13 can also be seen. The heater 3 extends over more than 50% of a cross-sectional area 8 of the reducing agent tank 1. The figure additionally shows the extraction pipe 4 with the heating element 7. Fins 23 are disposed on the heater 3 in such a way that reducing agent 2 may also flow towards the extraction point 5 even when the device 25 is inclined.

According to FIG. 2, the heater 3 is funnel-shaped in order to produce such a run-off surface 32 on the frozen reducing agent surface 14. It is also possible to combine both features. The heater 3 may then be funnel-shaped and additionally include fins 23.

Figure 4:
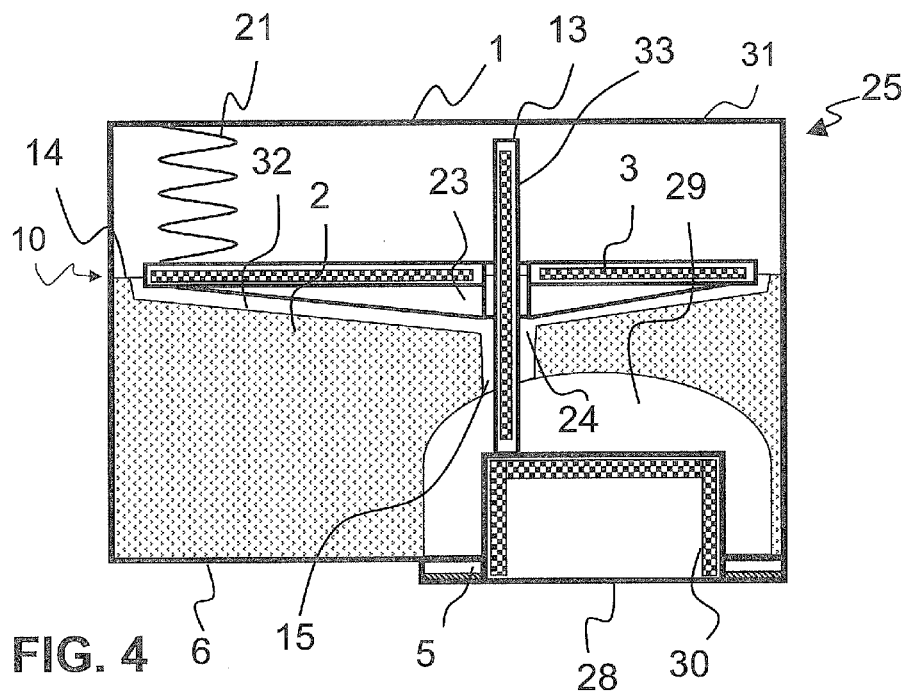
FIG. 4 is a similar view of a fourth variant embodiment of a device according to the invention.

The fourth variant embodiment according to FIG. 4 also includes such fins 23 on the heater 3. In exactly the same way, the heater 3 according to the seventh variant embodiment (FIG. 7) also has fins 23, which may produce a suitable run-off surface 32 on the frozen reducing agent surface 14.

According to the third variant embodiment of the device in FIG. 3, the heater 3 includes floats 26. These floats 26 ensure that the heater 3 is disposed in a defined position at least partially under the reducing agent surface 14. The heater 3 is, in particular, configured in such a way that it includes a heating portion 34 and a buoyancy portion 35. The buoyancy portion 35 formed by the floats 26 ensures correct positioning of the heater 3 in the reducing agent 2. As a result of the position of the heater 3 predetermined in this way, the heating portion 34 is covered by reducing agent 2 and heat may be introduced particularly efficiently into the reducing agent 2 by the heater 3. It is preferable for this floating heater to be no more than 5 centimeters away from the reducing agent surface 14.

Figure 5:
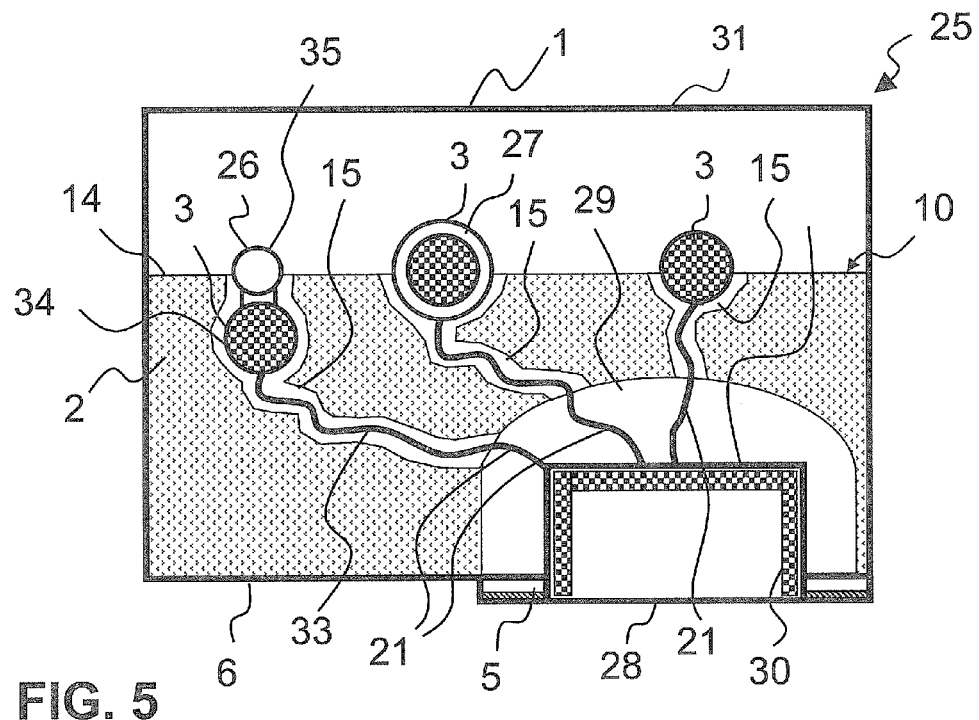
FIG. 5 is a similar view of a fifth variant embodiment of a device according to the invention.
Figure 6:
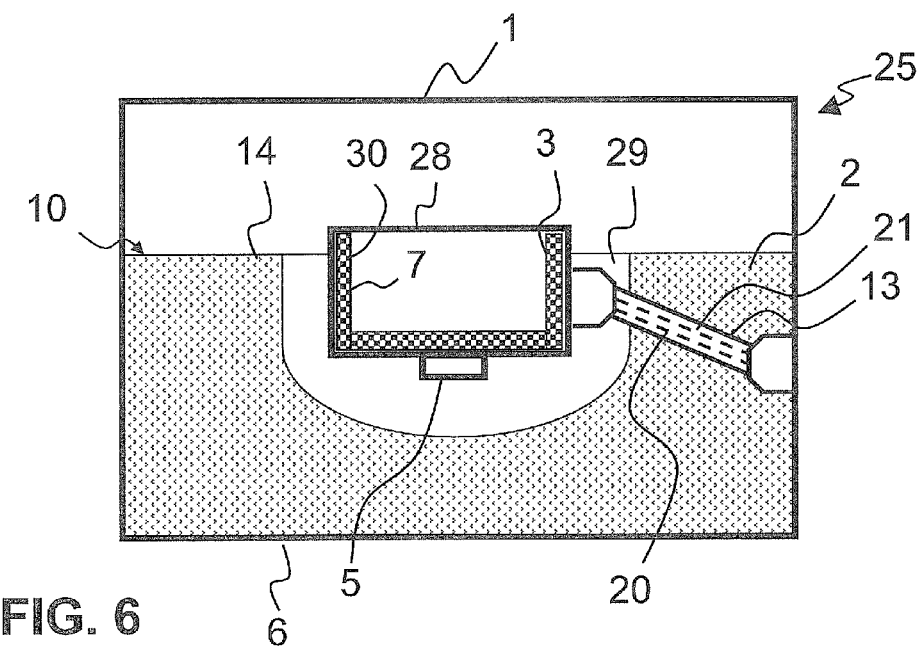
FIG. 6 is a similar view of a sixth variant embodiment of a device according to the invention.
Figure 7:
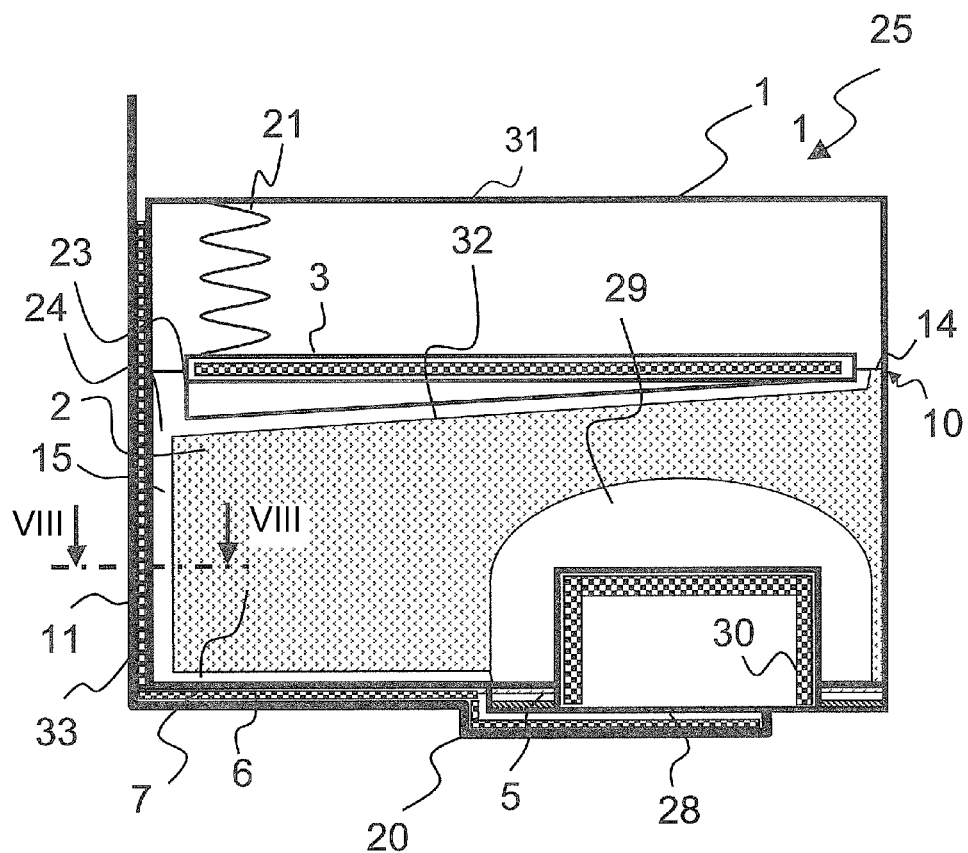
FIG. 7 is a similar view of a seventh variant embodiment of a device according to the invention.

In the variant embodiments according to FIGS. 4, 5 and 7 with the feed unit 28 on the tank bottom 6, a system heater 30 is provided in each case, through which reducing agent 2 on the outside of the feed unit 28 may be melted. The system heater 30 may additionally produce an ice cavity 29 in the frozen reducing agent 2 around the feed unit 28. If no liquid reducing agent 2 remains in the ice cavity 29, the ice cavity 29 constitutes thermal insulation for the feed unit 28 relative to the remaining reducing agent 2 in the reducing agent tank 1. This may occur if the feed unit 28 conveys the liquid reducing agent 2 more quickly than the system heater 30 is able to melt the reducing agent 2. In this way, the ice cavity 29 may prevent the system heater 30 from melting frozen reducing agent 2. For this reason, the mobile heater 3 in the reducing agent tank 1 is particularly advantageous in the variant embodiments according to FIGS. 4, 5 and 7 of the device 25 with the feed unit 28 disposed on the tank bottom 6.

According to the variant embodiment in FIG. 4, the vent heater 33 is formed of a bar-shaped guide structure 13, which extends away from the feed unit 28. A channel 15 is formed by the vent heater 33 along the guide structure 13.

In the seventh variant embodiment (FIG. 7), the vent heater 33 for forming a channel 15 from the heater 3 to the extraction point 5 is provided by a reducing agent line 20 attached to the outside of the tank wall 11. This reducing agent line 20 serves to convey the reducing agent 2 from the feed unit 28 to an exhaust gas treatment device in the exhaust gas system of an internal combustion engine. The reducing agent line 20 takes the form, for example, of a heatable hose with heating elements 7. The reducing agent line 20 thus forms a vent heater 33 for forming a channel 15 from the heater 3 to the extraction point 5, which is very easy to achieve irrespective of the configuration of the reducing agent tank 1.

Figure 8:
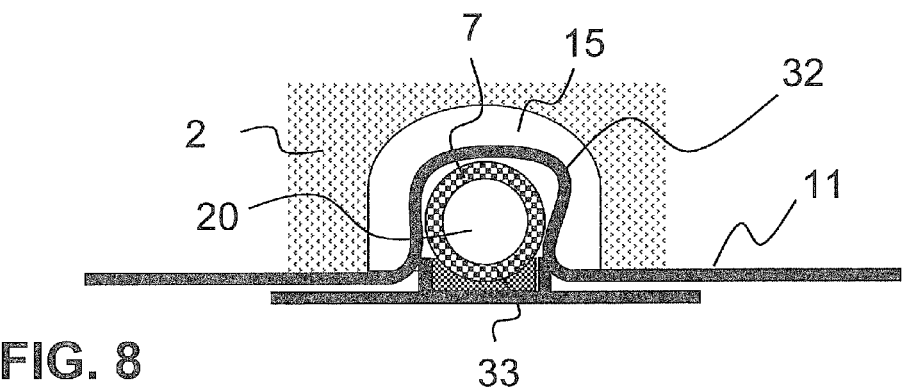
FIG. 8 is an enlarged, fragmentary, cross-sectional view taken along a line VIII-VIII of FIG. 7, in the direction of the arrows, showing a portion of the seventh variant embodiment of the device according to the invention.

FIG. 8 is an enlarged, fragmentary illustration of the reducing agent line 20 again attached to the outside of the tank wall 11. This reducing agent line 20 includes heating elements 7, through which a channel 15 may be produced in the reducing agent 2 on the inside of the tank wall 11.

According to the variant embodiment shown in FIG. 5, a plurality of heaters 3 are provided in the reducing agent tank 1. The heaters 3 float relatively freely in a predetermined movement radius in the reducing agent 2. The heaters 3 according to FIG. 5 may include different configurations. According to the variant shown on the left, the heater 3 includes a float 26 and is thus divided into a buoyancy portion 35 and a heating portion 34. This ensures that the heating portion 34 in each case is completely surrounded by reducing agent 2, resulting in particularly efficient input of heat into the reducing agent 2. The middle heater 3 in FIG. 5 includes a damper 27. This damper may, for example, be an elastic porous layer, with which externally acting forces are damped. This layer ensures that no noise or damage arise as a result of movement of the heater 3 in the reducing agent tank 1. The variant embodiment of the heater 3 shown on the right in FIG. 5 does not include such features. According to FIG. 5, the heaters 3 each take the form of spherical floats. Any other desired forms or shapes are also possible, however. For example, at least one freely mobile large-area heater 3 may also be present.

In the case of the heaters 3 according to FIG. 5, an electric supply line 21 which is provided, extends through the reducing agent 2 in each case. As already explained, these supply lines 21 must be sufficiently robust and/or extensible. The supply lines 21 include electric lines for supplying the heater 3. At the same time, the supply lines 21 include vent heaters 33. The vent heaters 33 melt channels 15 along the supply lines 21, from the heaters 3 to the extraction point 5. The electric lines may also simultaneously form the vent heater 33.

The variant embodiment of the device according to FIG. 6 includes a feed unit 28, which is disposed so as to float in its entirety in the reducing agent tank 1. This feed unit 28 has a system heater 30 for thawing reducing agent 2. This system heater 30 simultaneously forms the mobile active heater 3. When the reducing agent surface 14 falls in the reducing agent tank 1, the feed unit 28 may likewise fall. The heater 3 is thus also mobile. The heater 3 melts an ice cavity 29 into the reducing agent surface 14. The feed unit 28 and the heater 3 may drop into this ice cavity 29. In the variant embodiment according to FIG. 6, the feed unit 28 and the heater 3 also include a guide structure 13, which at the same time also constitutes the supply line 21 for the heater 3. In the variant embodiment according to FIG. 6, the reducing agent line 20 is also provided on the guide structure 13 for discharge of the reducing agent 2 out of the device 25.

Figure 10:
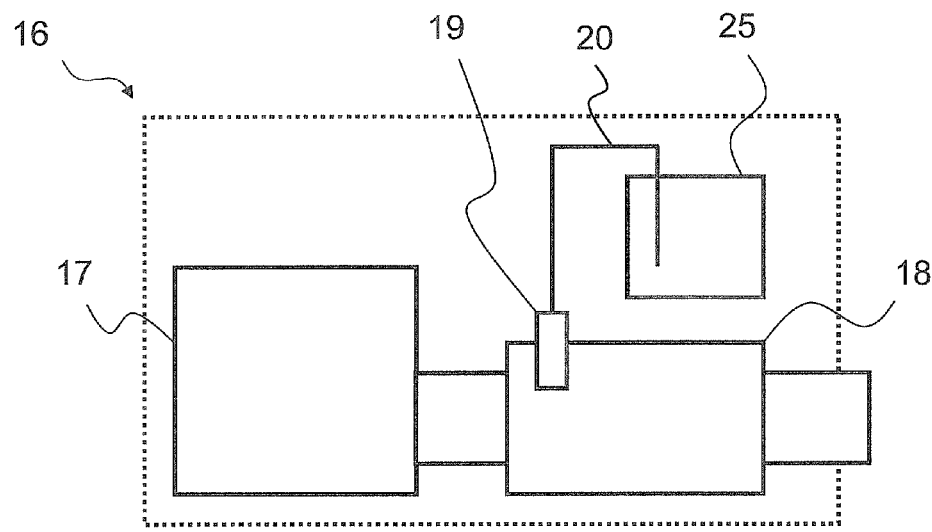
FIG. 10 is a vertical-sectional view of a motor vehicle including a device according to the invention.

FIG. 10 shows a motor vehicle 16 according to the invention, including an internal combustion engine 17 and an exhaust gas treatment device 18 for treating the exhaust gases of the internal combustion engine 17. The exhaust gas treatment device 18 includes a feed 19. The feed 19 is connected to the device 25 through a reducing agent line 20 and is supplied with reducing agent from the device 25 through the reducing agent line 20. The reducing agent 2 may thus, if necessary, be added to the exhaust gas and the exhaust gas may be cleaned using the "SCR" method.

The invention claimed is:

1. A device for providing a liquid reducing agent, the device comprising:
   a reducing agent tank for storing the liquid reducing agent;
   at least one active tank heater movably disposed in said reducing agent tank and including a supply line for supplying said at least one active tank heater with energy;
   an extraction point for reducing agent; and
   an active vent heater disposed on said supply line inside said reducing agent tank and configured to form a channel between said at least one active tank heater and said extraction point in frozen reducing agent inside said tank.

2. The device according to claim 1, which further comprises at least one component provided on said at least one active tank heater for detecting a filling level of the reducing agent in said reducing agent tank.

3. The device according to claim 1, which further comprises a guide structure disposed in said reducing agent tank and configured to guide said at least one active tank heater and to permit said at least one active tank heater to be moved along said guide structure.

4. The device according to claim 1, wherein said at least one active tank heater is disposed or shaped to form a run-off surface for thawed reducing agent during operation of said at least one active tank heater on a frozen reducing agent surface.

5. The device according to claim 1, wherein said at least one active tank heater is a float.

6. The device according to claim 5, wherein said at least one active tank heater includes at least one heating portion and at least one buoyancy portion.

7. A method for thawing frozen reducing agent in a reducing agent tank, the method comprising the following steps:
   a) movably positioning at least one active tank heater in vicinity of a reducing agent surface and supplying the at least one active tank heater with energy using a supply line;
   b) activating the at least one active tank heater if the reducing agent is frozen at the reducing agent surface;
   c) thawing the reducing agent at the reducing agent surface and moving the at least one active tank heater;
   d) feeding the thawed reducing agent to an extraction point for the reducing agent;
   e) providing an active vent heater inside the reducing agent tank on the supply line; and
   f) forming a channel in the frozen reducing agent inside the tank between the at least one active tank heater and the extraction point using the active vent heater.

8. A motor vehicle, comprising:
   an internal combustion engine;
   an exhaust gas treatment device associated with said internal combustion engine;
   a device for providing a liquid reducing agent according to claim 1; and
   a feed for supplying reducing agent from said device for providing a liquid reducing agent to said exhaust gas treatment device.

* * * * *